United States Patent [19]
Iwata et al.

[11] Patent Number: 5,438,962
[45] Date of Patent: Aug. 8, 1995

[54] WATER COOLED ENGINE

[75] Inventors: Yoshibumi Iwata; Akihiko Hoshiba; Junichi Hasegawa; Yasuhiko Shibata, all of Hamamatsu, Japan

[73] Assignee: Sanshin Kogyo Kabushiki Kaisha, Hamamatsu, Japan

[21] Appl. No.: 219,215

[22] Filed: Mar. 29, 1994

[30] Foreign Application Priority Data

Mar. 29, 1993 [JP] Japan .................. 5-093603

[51] Int. Cl.6 ............................ F01P 1/06
[52] U.S. Cl. .................. 123/41.31; 123/541; 417/372
[58] Field of Search ............ 123/41.31, 541; 417/372, 364

[56] References Cited

U.S. PATENT DOCUMENTS 3,835,822 9/1974 Mickle et al. ............... 123/41.31

Primary Examiner—Noah P. Kamen
Attorney, Agent, or Firm—Knobbe, Martens, Olson & Bear

[57] ABSTRACT

A water cooled outboard motor engine including several embodiments of ensuring that the fuel pumped by the fuel pump is not heated excessively. The embodiments include either cooling jackets through which engine coolant is circulated for cooling the fuel, or the insulation of the pumping element driven by the engine from the fuel.

21 Claims, 11 Drawing Sheets

WATER COOLED ENGINE

BACKGROUND OF THE INVENTION

This invention relates to a water cooled engine and more particularly to an improved fuel supply for the charge forming system of an engine that is water cooled.

Many forms of engine charge forming systems employ one or more fuel pumps which are driven mechanically from the engine and which pressurize the fuel that is supplied to the engine. When the fuel pump is driven by the engine, heat is transferred from the engine through at least the pumping element to the fuel and can cause elevations in its temperature. This is true even though the mounting for the fuel pump on the engine is thermally insulated. When the fuel becomes heated, it tends to vaporize and cause a loss in the efficiency of the pump and a leaning of the supply of fuel to the engine.

This condition can be understood in part by reference to FIG. 1 which is a curve showing the fuel temperature, the pump pressure and the area where vapor will be generated in the fuel. As may be seen, as the temperature of the fuel increases there is a likelihood that fuel vapor will be generated by thus decreasing the efficiency of not only the fuel pumping system but the charge forming system for the engine.

It is, therefore, a principle object of this invention to provide an improved arrangement for pumping fuel for an engine.

It is a further object of this invention to provide an engine fuel pumping system wherein the fuel will not be heated excessively, even though the pump is driven directly by the engine.

It is a still further object of this invention to provide a number of different ways in which the fuel pumped by an engine can be protected from overheating.

SUMMARY OF THE INVENTION

This invention is adapted to be embodied in an internal combustion engine having a charge forming system and a fuel pump having a pumping element that is driven by the engine for pumping fuel for the charge forming system. Cooling means are provided for reducing the temperature of the fuel pumped by the fuel pumping element.

In one embodiment of the invention, the cooling means comprises a cooling jacket formed in or in proximity to the fuel pump for lowering the temperature of the fuel pump and the fuel therein.

In another embodiment of the invention, the cooling means comprises a separate cooling jacket through which engine coolant is circulated and which exchanges heat from fuel pumped.

In accordance with a further embodiment of the invention, the cooling means comprises the formation of the pumping element from an insulating material so that it will not transfer heat from the engine to the fuel.

DETAILED DESCRIPTION OF THE PREFERRED EMBODIMENTS OF THE INVENTION

Figure 1:
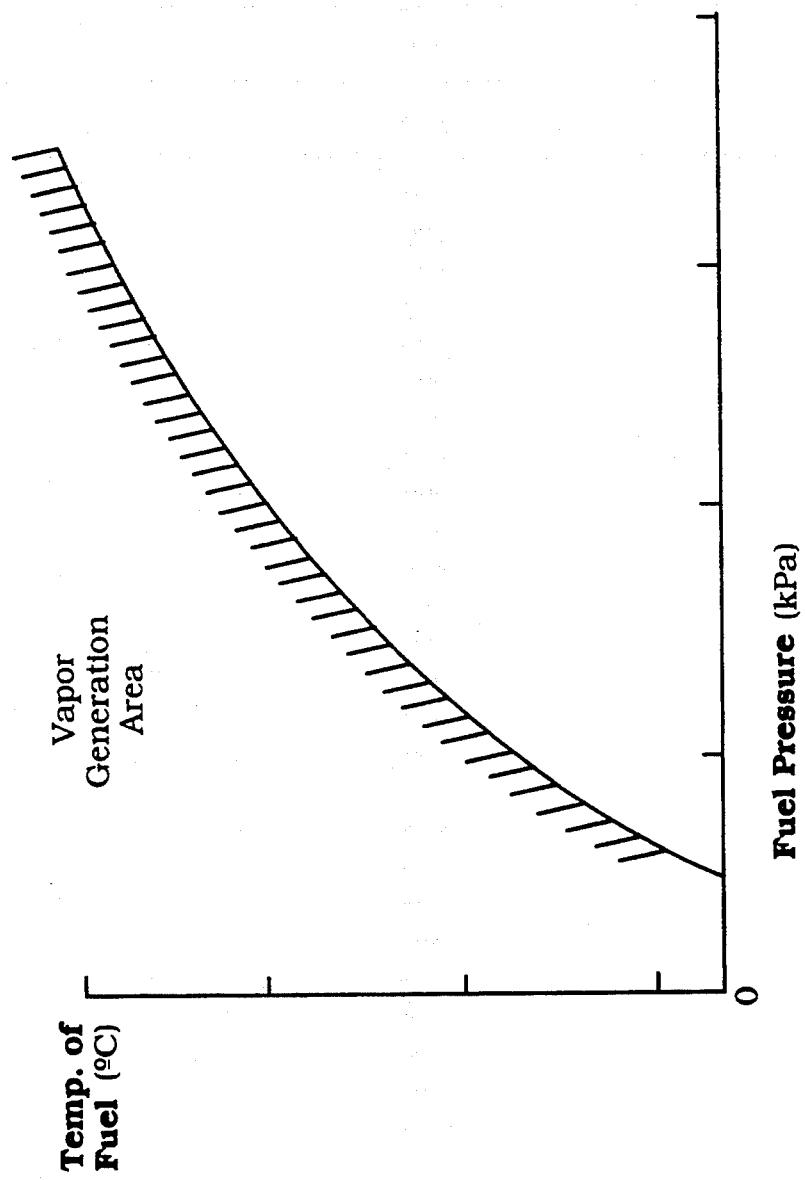
FIG. 1 is a graphical view showing the vapor generation area when fuel vapor is generated in relation to temperature of the fuel and fuel pressure.
Figure 2:
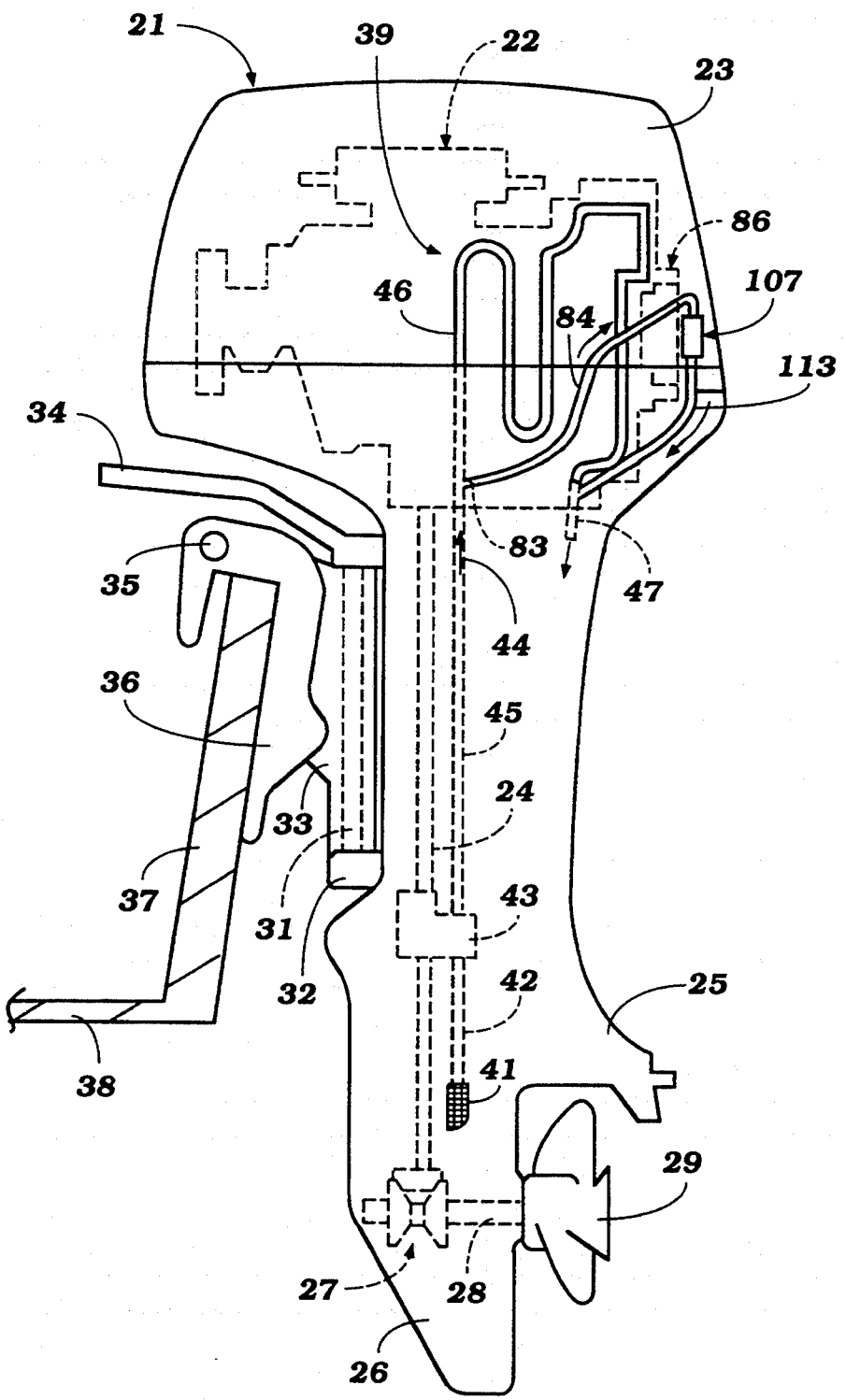
FIG. 2 is a side elevational view of an outboard motor as attached to the transom of a watercraft, shown partially and in cross section, and illustrating an embodiment of the invention.
Figure 3:
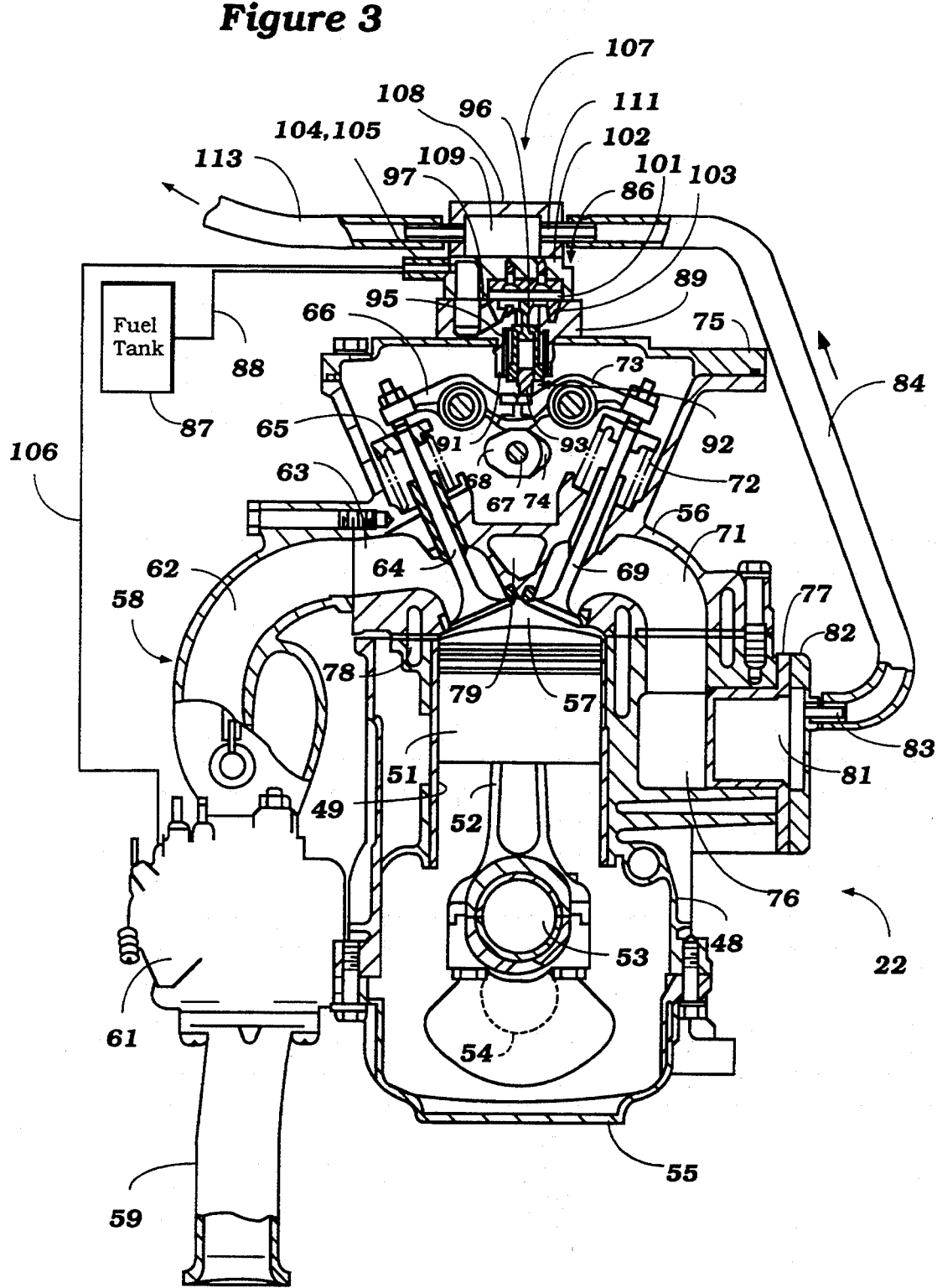
FIG. 3 is an enlarged top plan view of the power head of the engine, with portions broken away and shown in section and other portions shown schematically.
Figure 4:
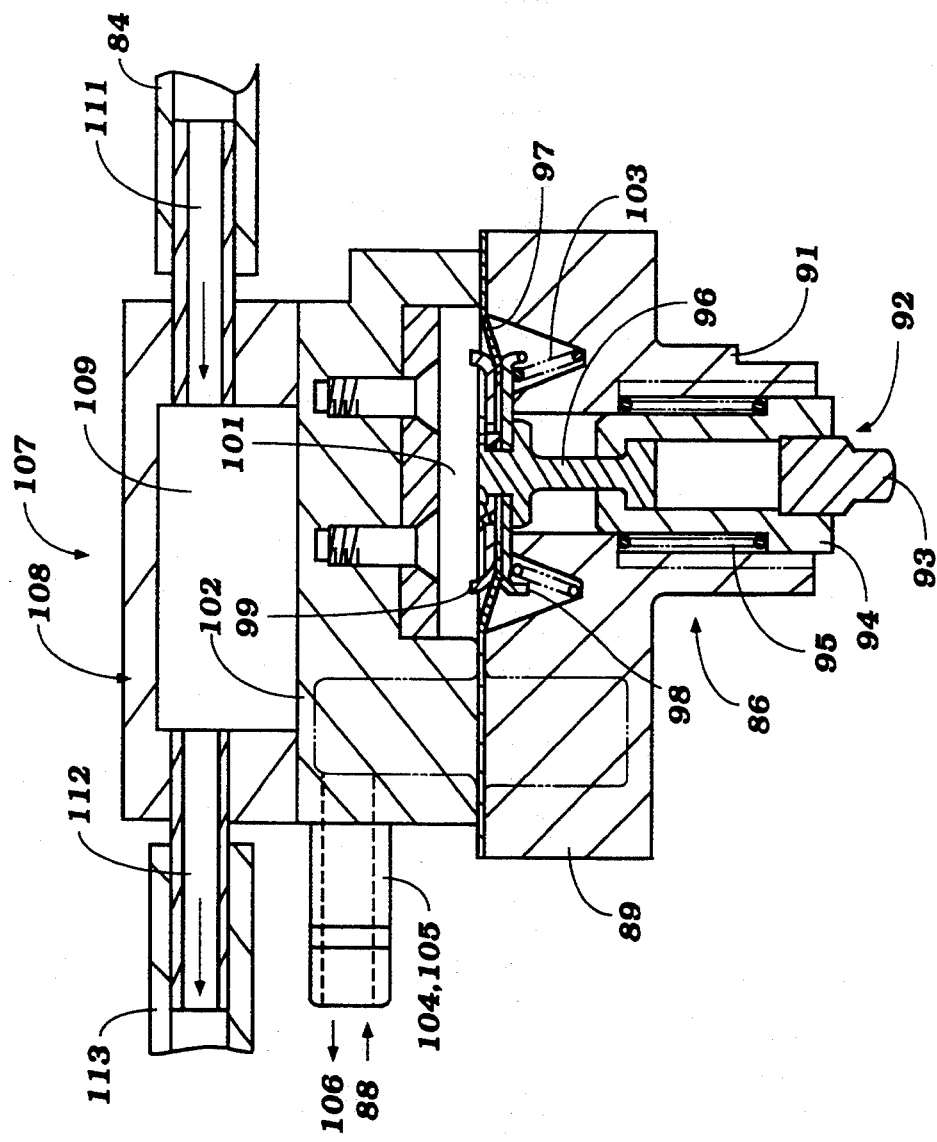
FIG. 4 is a further enlarged cross-sectional view showing the fuel pump and cooling arrangement in accordance with this embodiment of the invention.

Referring first to the embodiment of FIGS. 2-4 and initially primarily to FIG. 1, an outboard motor constructed in accordance with this embodiment of the invention as identified generally by the reference numeral 21. The invention is described in conjunction with an outboard motor because this type of device is normally powered by a water cooled internal combustion engine and the invention, which relates primarily to the fuel supply system for the engine, has particular utility in conjunction with water cooled engines. It will be readily apparent to those skilled in the art, however, how the invention can be applied to other applications for internal combustion engines.

The outboard motor 21 includes an internal combustion engine, indicated generally by the reference numeral 22, and which has construction as will be best understood by reference later to FIG. 3. The engine 22 forms a portion of the powerhead of the outboard motor 21 and this powerhead is completed by a protective cowling 23 that encircles the engine 22.

The engine 22, as is typical with outboard motor practice, is supported so that its output shaft (a crankshaft) rotates about a vertically extending axis. This crankshaft is coupled, by means of a splined connection or the like to a driveshaft 24 that is journaled for rotation within a driveshaft housing 25 that depends from the powerhead thus far described. At its lower end, the driveshaft 24 depends into a lower unit 26 and there drives a conventional bevel gear type of forward neutral transmission, indicated at 27, and which drives a propeller shaft 28 journaled in the lower unit 26 for driving a propeller 29 in selected forward or reverse directions.

A steering shaft 31 is a affixed to the driveshaft housing 25 by means including a lower bracket 32. This steering shaft 31 is journaled for rotation about a vertically extending steering axis within a swivel bracket 33 for steering of the outboard motor 21 in a well known manner. A tiller 34 is affixed to the upper end of the steering shaft 31 for effecting this steering movement.

The swivel bracket 33 is pivotably connected by means of a pivot pin 35 to a clamping bracket 36 for tilt and trim movement of the outboard motor 21 in a well known manner. The clamping bracket 36 includes a clamping or other fixing device for affixing it to a transom 37 of an associated watercraft hull shown partially and in cross section and identified generally by the reference numeral 38.

The engine 22 is, as is typical with outboard motor practice, water cooled and is provided with a coolant delivery system, indicated generally by the reference numeral 39 for drawing water from the body of water in which the watercraft is operating, circulating it through a cooling jacket of the engine 22 and discharging it back into the body of water in which the watercraft is operating. This cooling system 39 includes a water inlet 41 formed in the lower unit 26 and which permits water to be drawn through an inlet conduit 42 by means of a water pump 43. The water pump 43 is driven by the driveshaft 24 and is positioned at the interface between the driveshaft housing 25 and lower unit 26. This water is then delivered upwardly, as shown by the arrow 44 through a supply conduit 45 that communicates with a cooling jacket shown schematically and indicated by the reference numeral 46 in FIG. 1. This cooling jacket will be described in more detail later by reference to FIG. 2. This coolant is then circulated in a desired flow pattern through the cooling jacket 46 of the engine 22 and is discharged through a discharge conduit 47 back into the driveshaft housing 25, normally into the exhaust system positioned therein, for return to the body of water which the watercraft is operating along with the exhaust gases.

It will be understood that the engine cooling jacket 46 include a thermostatically operated valve and a pressure operated valve so as to provide the desired coolant flow and temperature control for the engine 22. The construction of the outboard motor 21 is thus far described may be considered to be conventional and, for that reason further description of it is not believed to be necessary to understand for those skilled in the art to understand and practice the invention.

The construction of the engine 22 will now be described by particular reference to FIG. 3. Again, it is to be understood that the invention deals primarily with the fuel supply for the engine 22 and, therefore, the description of the engine 22 should be considered to be exemplary only of one of the many types of engines with which the invention may be practiced. In the illustrated embodiment, the engine 22 is of the inline 4-cycle type but it will be readily apparent to those skilled in the art how the invention can be employed with engines of other types, other cylinder numbers and configurations and engines which operate on the 2-cycle as well as the 4-cycle principle.

The engine 22 includes a cylinder block 48 in which one or more cylinder bores 49 are formed by pressed or cast in cylinder liners. Pistons 51 reciprocate in the cylinder bores 49 and are connected to the small ends of connecting rods 52 by means of piston pins (not shown). The big or large ends of the connecting rods 52 are journaled on respective throws 53 of a crankshaft 54. As has been previously noted, the crankshaft 54 rotates about a vertically disposed axis and is connected suitably to the driveshaft 44. The crankshaft 54 rotates in a crankcase chamber formed by the cylinder block 48 and a crankcase member 55 fixed to the cylinder block 48 in a known manner.

A cylinder head 56 is affixed to the cylinder block 48 in a known manner and has individual recesses 57 which cooperate with the pistons 51 and cylinder bore 49 so as to form the combustion chambers of the engine 22.

A fuel air charge is delivered to the combustion chambers 57 by means of an induction in charge forming system, indicated generally by the reference numeral 58 and which includes an air inlet device 59 that draws atmospheric air from within the protective cowling 23. Air is admitted to the interior of the cowling member 23 through a suitable atmospheric air inlet formed in this cowling member.

The air is then delivered to a charge former in the form of a carburetor 61 which receives fuel from a fuel supply system, to be described. This then forms an air fuel mixture which is delivered to an induction passage 62 which, in turn, communicates with an intake passage 63 formed in one side of the cylinder head 56. The intake passage 63 terminates at a valve seat which communicates with the combustion chamber 57 and the flow through this valve seat is controlled by an intake valve 64 slidably supported in the cylinder head assembly 56 and urged to its closed positioned by a return spring 65 in a well known manner. The intake valves 64 for the engine are operated by means of rocker arms 66 from a single overhead camshaft 67. It is journaled within the cylinder head assembly 56 in a known manner. The camshaft 67 is driven at one-half crankshaft speed by any suitable driving mechanism. Intake cam lobes 68 are formed on the camshaft 67 and cooperate with the intake rocker arms 66 for opening the intake valves 64 in a manner well known in this art.

Exhaust valves 69 are also supported in the cylinder head 56 on the side thereof opposite the intake valves 64. These exhaust valves 69 control the flow through exhaust passages 71 formed in the side of the cylinder head 56 opposite the intake passages 63. The exhaust valve 69 are urged to their close position by valve spring 72 and are opened by means of rocker arms 73 operated by exhaust cam lobes 74 formed on the camshaft 66 in a well known manner.

The valve operating mechanism comprised of the camshaft 67, rocker arms 66 and 73 and intake and exhaust valves 64 and 69 lie within a cam chamber which is closed by a cam cover 75 that is affixed to the cylinder head 56 in a well known manner.

The exhaust gases from the cylinder head exhaust passages 71 are transferred to an exhaust manifold 76 formed in the cylinder block 48. This exhaust manifold 76 has an opening through a side of the cylinder block 48 which is closed by a cover plate 77 for a reason to be described. The exhaust gases are discharged from the exhaust manifold 76 downwardly into an expansion chamber (not shown) formed in the drive shaft housing 25 for silencing and discharge to the atmosphere through any known exhaust system which may include a high speed through the hub propeller exhaust and an above the water, low speed exhaust. Again, the construction is thus far described may be considered to be conventional and, for that reason, further description of it is not believed to be required.

As has been previously noted, the engine 22 is water cooled and for this purpose the cylinder block and cylinder head are formed with respectively cooling jackets, shown partially at 78 and 79 through which water is circulated from the supply conduit 45 and water pump 43. These cooling jackets 78 and 79 are those shown schematically in FIG. 2 and indicated by the reference numeral 46 therein. In addition, the cover plate 77 forms a cooling jacket 81 along with a closure plate 82 and water is also supplied to this cooling jacket 81 from the supply conduit 45 upstream of the cylinder block and cylinder head cooling jackets 78 and 79. Water from the exhaust manifold cooling jacket 81 is discharged through a conduit 84 from a nipple 83 in the closure plate 82 for a reason which will be described. This conduit 84 is intended to provide coolant for the cooling for the fuel supplied for the carburetors, in a manner which will now be described by particular reference to FIGS. 2–4.

The engine 22 is provided with a fuel pump, indicated generally by the reference numeral 86 which draws fuel from a remotely positioned fuel tank shown schematically in FIG. 3 and identified generally by the reference numeral 87 through a supply line 88 some of which may be external to the outboard motor 21.

The fuel pump 86 is mounted on the cam cover 75 and has a main housing portion 89 that has a pilot part 91 that extends through an opening in the cam cover 75 and into the cam chamber. A pump driving arrangement, indicating generally by the reference numeral 92 is comprised of a follower 93 that is engaged with one of the exhaust rocker arms 73 and is operated by it. A plunger 94 is connected to the follower 93 and is slidably supported within a bore formed in the pilot part 91 and is urged into engaging with the rocker arm 73 by a return spring 95.

This plunger 94 has a diaphragm connecting member 96 formed at its upper end that is connected to the center of a diaphragm 97. The diaphragm 97, in turn, has a pair of rigid backing plates 98 and 99 which are formed on its opposite sides and forms a pumping chamber 101 with a cover piece 102 that is affixed to the main pump housing 89 in a suitable manner. A coil compression spring 103 engages the underside of the diaphragm plate 98 and normally urges the diaphragm 97 in a direction to reduce the volume of the chamber 101.

Inlet and discharge nipples 104 and 105 are carried by the cover piece 102 and are connected to the supply conduit 88 and to a discharge conduit 106 (FIG. 3) that supplies fuel to the carburetor 61. One-way valves (to be described later) are disposed in the conduits communicating the nipples 104 and 105 with the pumping chamber 101 so that when the pumping chamber is enlarging fuel will be drawn from the conduit 88 and inlet nipple 104 into the pumping chamber 101. When the diaphragm 97 is moved upwardly through the action of the rocker arms 73, the fuel will be driven past a delivery valve to the supply conduit 106 through the discharge nipple 105. Again, this construction may be considered to be conventional.

All of the construction as thus far described may be considered to be conventional. With these conventional structures as aforenoted, heat is transferred to the pumping chamber 101 from the pumping drive 92 and through the housing assemblies and plunger 94 even though insulation is employed. This heating of the fuel can deteriorate performance, and in accordance with an important feature of the invention, a cooling arrangement, indicated generally by the reference numeral 107 is provided for exchanging heat from the fuel pump 86 and transferring it to the liquid coolant of the engine.

This cooling system, in this embodiment, includes a cover piece 108 that is affixed to the cover piece 102 of the fuel pump 86 in any suitable manner. This cover piece 108 defines a cooling chamber 109 that is in direct heat exchange relationship with the cover piece 102. The conduit 84 is connected to an inlet fitting 111 of the cover piece 108 and delivers coolant to the cooling chamber 109 as shown by the arrow in FIG. 4. The coolant is then withdrawn from the chamber 109 through a discharge nipple 112 that communicates with a flexible conduit 113 which, in turn, delivers coolant back to the discharge side 47 of the engine cooling jacket for return back to the body of water in which the watercraft is operating. Hence, there will be good heat exchange with the fuel and the temperature of the fuel will be maintained low enough to avoid vapor from forming in it and deterioration of the efficiency of the pump and charge forming system.

Figure 5:
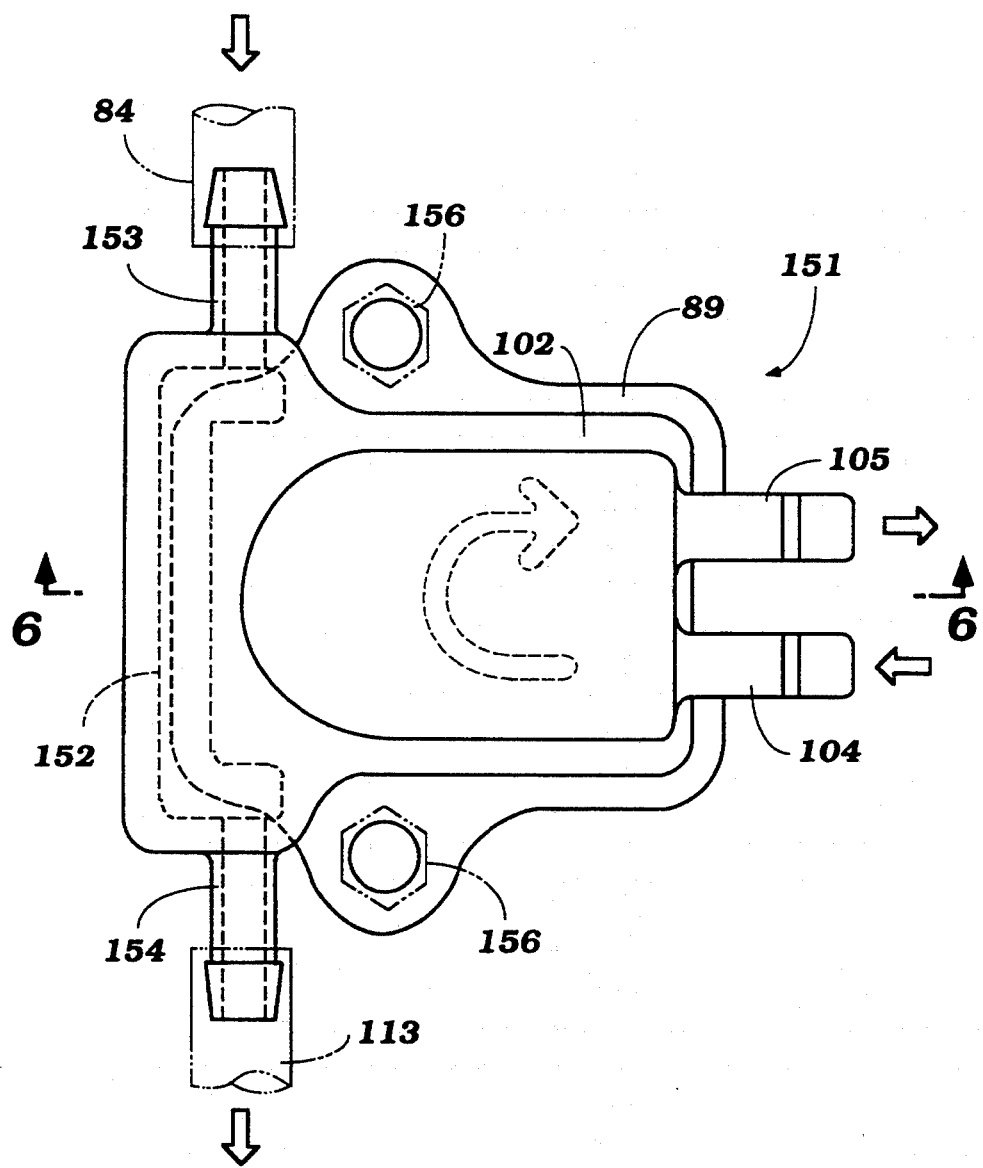
FIG. 5 is a top plan view of a fuel pump constructed in accordance with a further embodiment of the invention.
Figure 6:
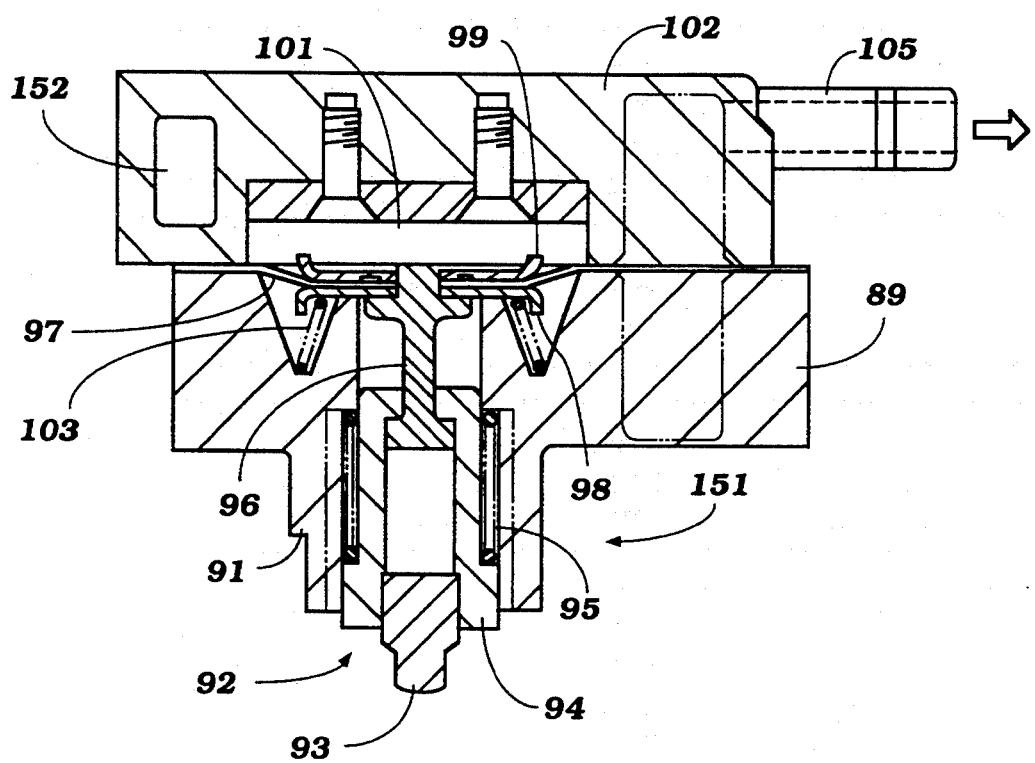
FIG. 6 is a cross-sectional view taken along the Line 6—6 of FIG. 5.
Figure 7:
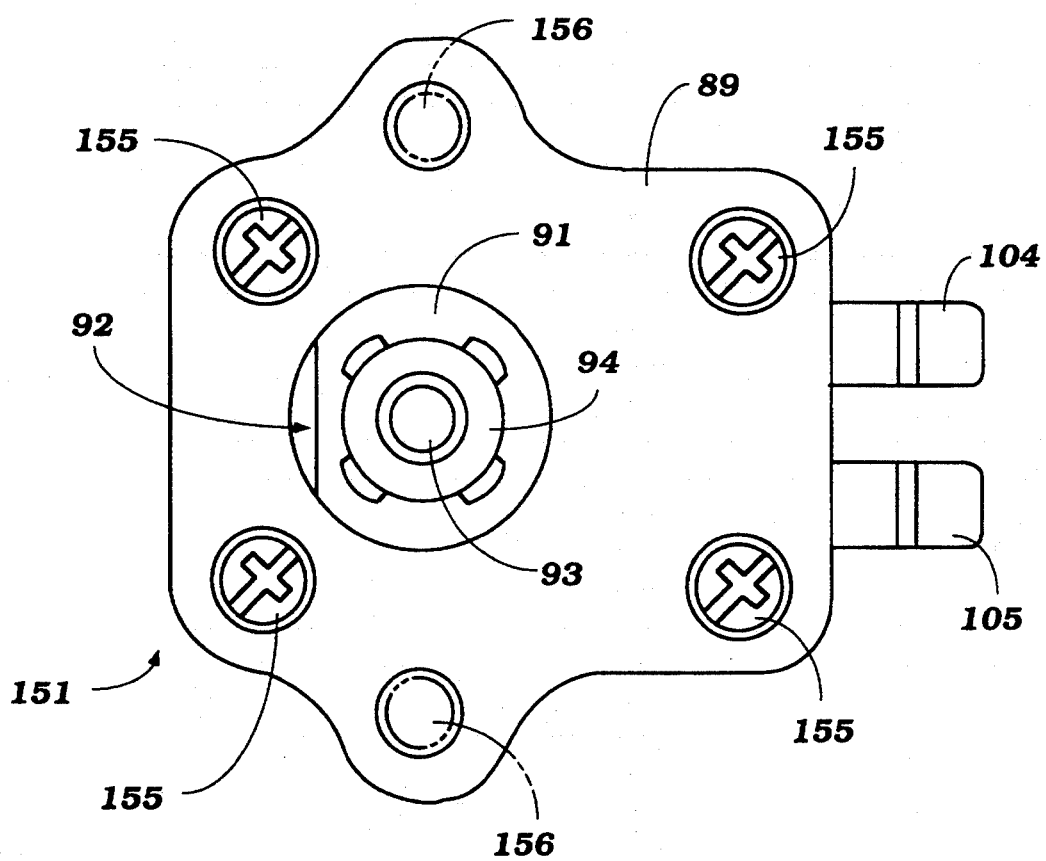
FIG. 7 is a bottom plan view of this embodiment.

A fuel pump constructed in accordance with another embodiment of the invention is shown generally in FIG. 5–7 and identified by the reference numeral 151. The fuel pump 151 has a construction generally the same as the fuel pump 86 of the previously described embodiment. Where components are the same they have been identified by the same reference numerals and certain components of the basic fuel pump which are not shown in the other figures appears in these figures. In this embodiment, a cooling jacket 152 is formed directly in the cover piece 102 rather than in a separate member. An inlet nipple 153 at one side communicates the cooling jacket 152 with the conduit 84 while an outlet nipple 154 at the other side communicates it with the coolant return conduit 113. Hence, coolant is directly circulated through the fuel pump 151 around the pumping chamber 101 and hence good heat exchange and cooling is provided.

In FIG. 7, threaded fasteners 155 appear which connect the cover piece 102 to the main body 89 and threaded fasteners appear in FIGS. 5 and 7 and are identified by the reference numeral 156 which are employed for affixing the pump assembly 151 to the cam cover 75.

Figure 8:
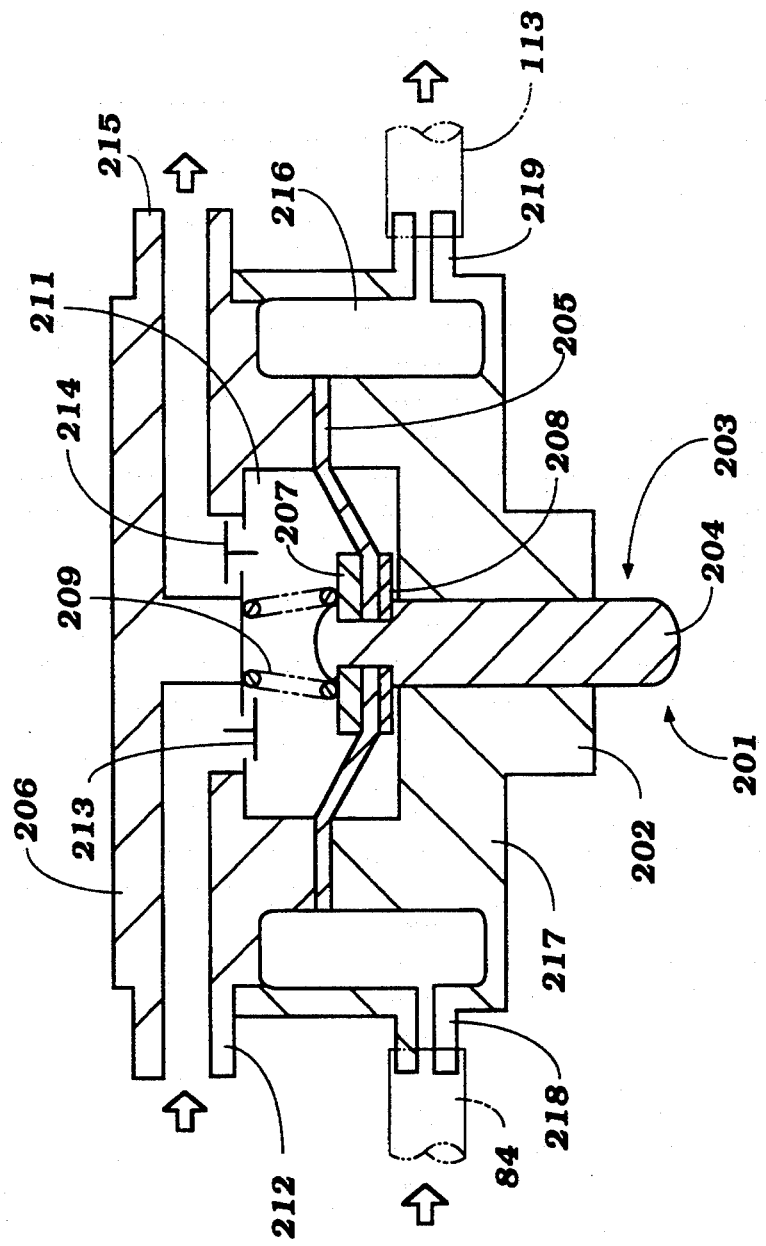
FIG. 8 is a cross-sectional view, in part similar to FIGS. 4 and 6 and shows a further embodiment of the invention.

A fuel pump having an integral cooling jacket for the fuel similar to the embodiment of FIGS. 5–7 is shown in FIG. 8 and is identified generally by the reference numeral 201. This embodiment shows some further details of the fuel pump not shown in the other figures and also shows a slightly changed construction. In this embodiment, the fuel pump 201 includes a main housing piece 202 that extends through the cam cover 75 as with the previously described embodiments. A pump driving assembly 203 including a plunger portion 204 that engages the rocker arm 73 extends through the main housing portion 202. A diaphragm 205 is fixed to the main housing piece 202 by a cover piece 206. The diaphragm 205 is connected to the plunger 204 by upper and lower retainer plates 207 and 208. A coil compression spring 209 is positioned within a pumping chamber 211 formed by the cover plate 206.

Fuel is drawn into the pumping chamber 211 from an inlet nipple 212 formed in the cover plate 206 and past a delivery check valve 213 when the diaphragm 205 is moving downwardly to the position shown in FIG. 8. When the diaphragm 205 is urged upwardly by the action of the rocker arm 73 with the pump plunger 204 the fluid will be discharged from the pumping chamber 211 past a supply check valve 214 to a discharge nipple 215 for delivery to the carburetor.

In this embodiment, a cooling jacket 216 is formed around the pumping chamber 211 within a portion 217 of the body member 202. Coolant is delivered to this cooling jacket 216 through an inlet nipple 218 from the conduit 84 and is discharged from this cooling chamber through a discharge nipple 219 to the return conduit 113. Thus, it should be readily apparent that this embodiment also is effective in providing good cooling for the fuel through an integral cooling jacket formed in the fuel pump 201.

Figure 9:
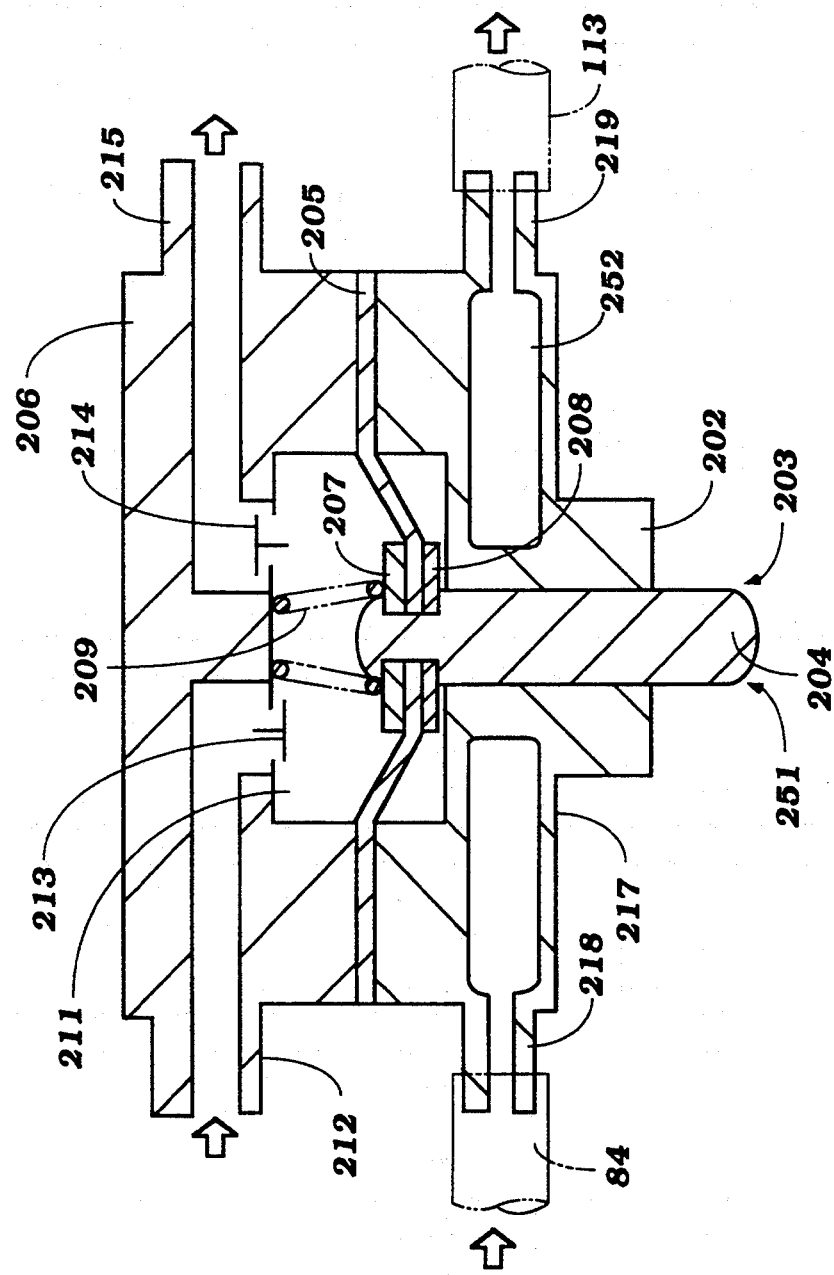
FIG. 9 is a cross-sectional view, in part similar to FIGS. 4, 6 and 8 and shows yet another embodiment of the invention.

A fuel pump having an integral cooling jacket and formed in accordance with another embodiment of the invention is shown in FIG. 9 and is identified generally by the reference numeral 251. This embodiment differs from that of FIG. 8 only in the shape and location of the cooling jacket for the fuel, which cooling jacket is indicated by the reference numeral 252 in this figure. This cooling jacket 252 is formed primarily beneath the pumping chamber 211. In all other regards this embodiment is the same as that previously described and, for that reason, components which are the same have been identified by the same reference numerals and will not be described again.

Figure 10:
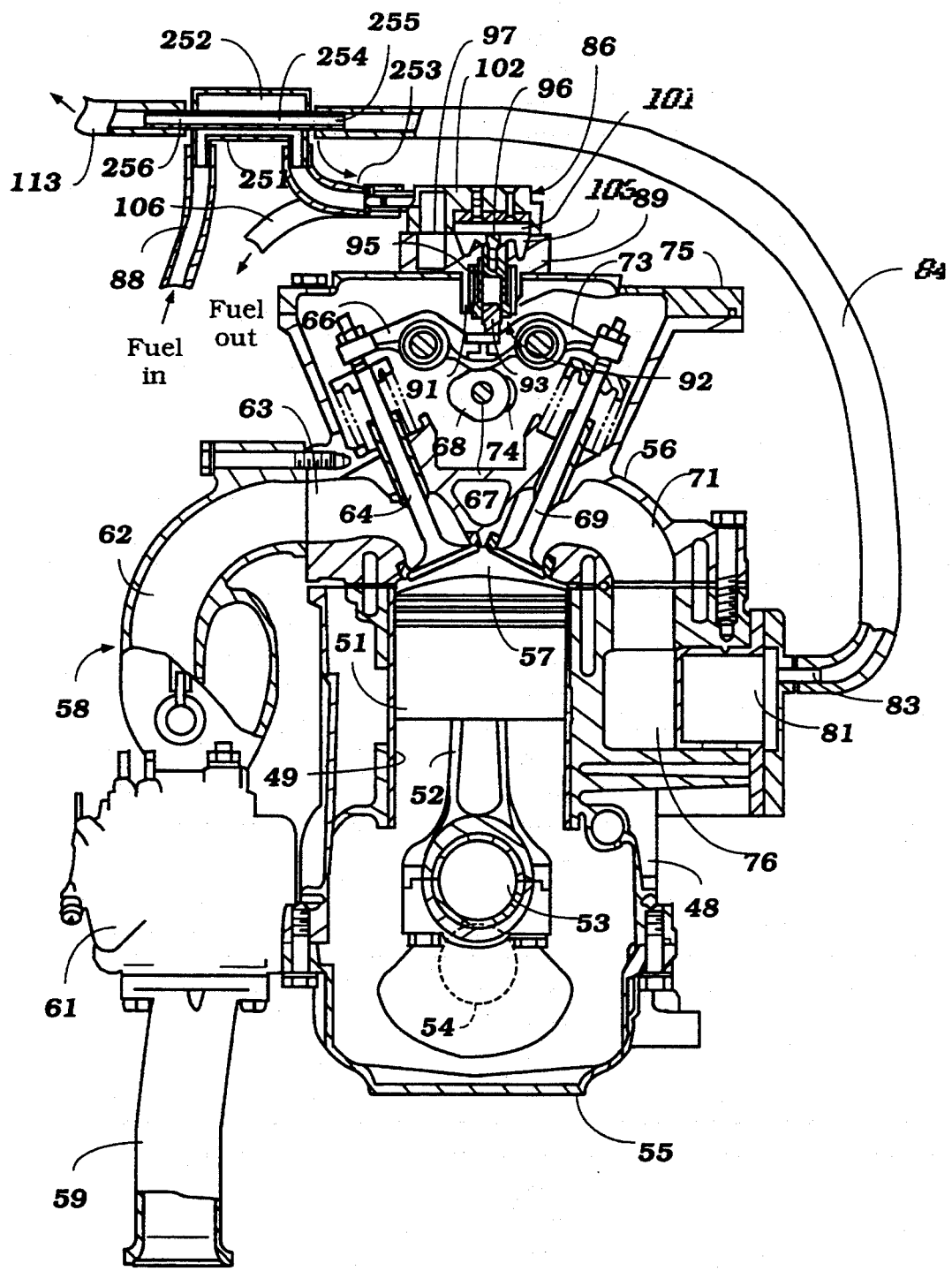
FIG. 10 is a top plan view, in part similar to FIG. 3, showing another embodiment of the invention, in part in cross section.

In all of the embodiments of the invention as thus far described the fuel has been cooled in the fuel pump itself. FIG. 10 shows another embodiment of the invention, which is generally similar to the embodiment of FIGS. 2–4 but wherein the fuel is cooled externally of the fuel pump. Because of the similarity of this embodiment to that of FIGS. 2–4 components of the engine fuel pump, cooling system and fuel supply system which are the same have been identified by the same reference numerals and will be described again only insofar as is necessary to understand the construction and operation of this embodiment.

In this embodiment, the fuel conduit 88 leading from the fuel tank delivers the fuel not directly to the fuel pump 86 but rather to a heat exchanger 251 that has an outer jacket portion 252 through which the fuel passes for delivery through a conduit 253 to the fuel pump 86. A tube or series of tubes 254 extends through the cooling jacket 252 and has an inlet nipple 255 and a discharge nipple 256 for receiving the coolant from the flexible conduit 84 and returning it to the body of water in which the watercraft is operating through the discharge conduit 113. In this way, the fuel will be cooled significantly before it is delivered to the fuel pump 86 and any heating which will occur there will not cause the fuel to be delivered at an elevated temperature nor will vapor form.

Figure 11:
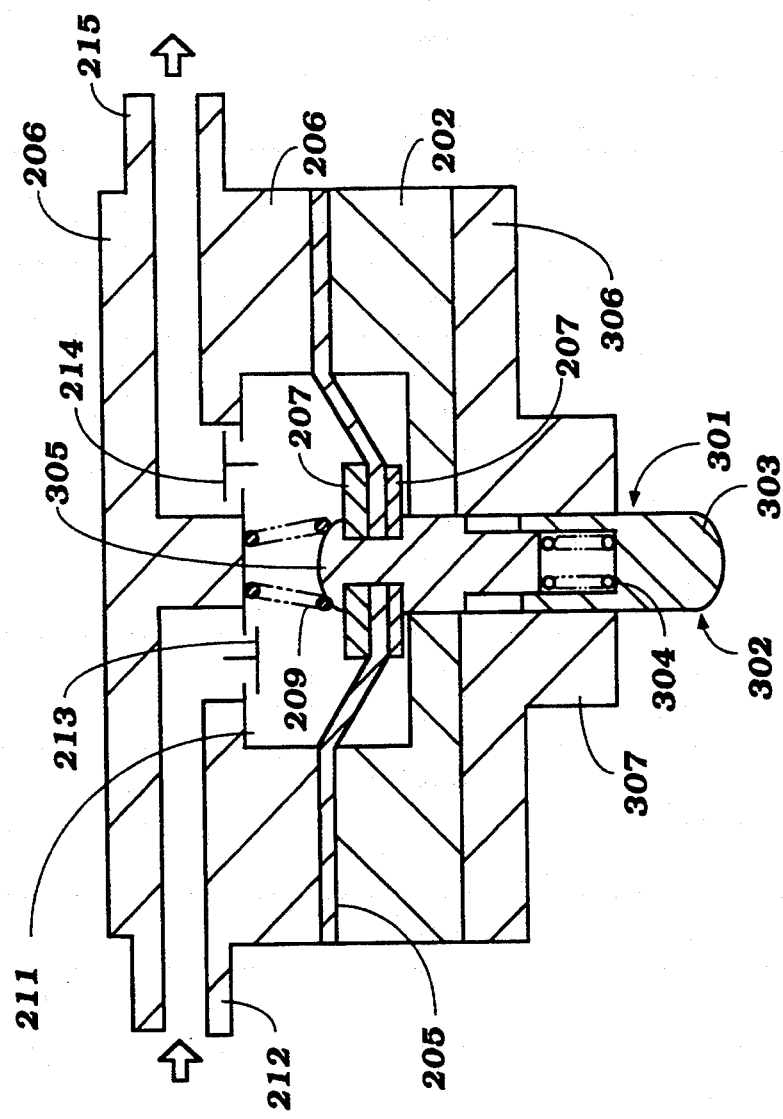
FIG. 11 is a cross-sectional view, in part similar to FIGS. 4, 6, 8 and 9, and shows a still further embodiment of the invention.

All of the embodiments thus far described employ some form of cooling jacket or heat exchanger for cooling the fuel. FIG. 11 shows another embodiment, which is generally similar to the embodiments of FIGS. 8 and 9 and wherein the fuel is cooled or rather heating is avoided in a slightly different manner. It is to be understood that this method in construction can be utilized in combination with any of the embodiments previously described and because of the similarity of this embodiment to those previously described where components are the same or substantially the same they have been identified by the same reference numerals.

In this embodiment, a drive mechanism, indicated generally by the reference numeral 301 is provided for driving the diaphragm 205 while insulating the diaphragm 205 and the pumping cavity 211 from the temperature of the engine. Hence, there is provided a composite follower 302 that consists of a heat insulating material preferably one of non-metallic construction and indicated generally by the reference numeral 203 which contacts the rocker arm 73. A coil compression spring 304 is loaded between this follower 303 a diaphragm actuator 305 which is fixed to the diaphragm 205 as with the previously described embodiments. In addition to this construction, an insulating spacer 306 is interposed between the main body portion 202 and has a projection 307 that extends through the cam cover 75 and which also is formed from a heat insulating material so as to ensure against heating of the fuel.

It should be readily apparent from the foregoing descriptions that the described embodiments of the invention are very effective in ensuring that the fuel pumped by the fuel pump will not be heated excessively and the fuel can be cooled to avoid vapor being formed. Of course, the preceding description is that of a number of embodiments of the invention and various changes and modifications may be made without departing from the spirit and scope of the invention, as defined by the appended claims.

We claim:

1. An internal combustion engine having a charge forming system, a cylinder head journaling a cam shaft in a valve chamber thereof, a fuel pump having a pump element driven mechanically by said engine cam shaft for pumping fuel for said charge forming system, and cooling means for reducing the temperature of the fuel pumped by said pumping element.

2. The internal combustion engine of claim 1, wherein the cooling means comprises a cooling jacket at least partially encircling the fuel.

3. The internal combustion engine of claim 2, wherein the cooling jacket is formed in the fuel pump.

4. The internal combustion engine of claim 3, wherein the cooling jacket is formed contiguous to the pumping chamber of the fuel pump in which a pumping device is contained.

5. The internal combustion engine of claim 4, wherein the cooling chamber is formed around the pumping chamber.

6. The internal combustion engine of claim 4, wherein the cooling chamber is formed along one side of the pumping chamber.

7. The internal combustion engine of claim 2, wherein the cooling jacket is formed separately from the fuel pump and cooperates with a conduit that supplies fuel to said fuel pump.

8. The internal combustion engine of claim 1, wherein the cooling means comprises an insulating element driven by the cam shaft for reducing the transfer of heat to the fuel.

9. The internal combustion engine of claim 1, wherein the engine is water cooled and the cooling jacket is supplied with water for cooling the fuel by a water pump for said engine.

10. The internal combustion engine of claim 9, in combination with an outboard motor wherein the engine forms the portion of the powerhead of the outboard motor and wherein the pump element is driven by a rocker arm operated by the cam shaft.

11. The internal combustion engine of claim 10, wherein the cooling means comprises a cooling jacket at least partially encircling the fuel.

12. The internal combustion engine of claim 11, wherein the cooling jacket is formed in the fuel pump.

13. The internal combustion engine of claim 12, wherein the cooling jacket is formed contiguous to the pumping chamber of the fuel pump in which a pumping device is contained.

14. The internal combustion engine of claim 13, wherein the cooling chamber is formed around the pumping chamber.

15. The internal combustion engine of claim 14, wherein the cooling chamber is in direct heat exchanging relationship to the diaphragm.

16. The internal combustion engine of claim 13, wherein the cooling chamber is formed along one side of the pumping chamber.

17. The internal combustion engine of claim 11, wherein the cooling jacket is formed separately from the fuel pump and cooperates with a conduit that supplies fuel to said fuel pump.

18. The internal combustion engine of claim 10, wherein the cooling means comprises an insulating element driven by the cam shaft for reducing the transfer of heat to the fuel.

19. An internal combustion engine having a charge forming system, a fuel pump for delivering fuel to said charge forming system, said fuel pump comprising an outer housing comprised of a pair of interconnected parts defining a cavity therebetween, a diaphragm affixed between said housing parts and dividing said cavity into a pumping chamber for receiving and pumping fuel and a driving chamber for containing an element for driving said diaphragm, a cooling jacket formed in said housing in proximity to said cavity for cooling fuel pumping chamber, means for operating said diaphragm driving element from a component of said engine for pumping fuel, and means for circulating liquid coolant through said cooling jacket for cooling the fuel.

20. The internal combustion engine of claim 19, wherein the cooling chamber is formed around the pumping chamber.

21. The internal combustion engine of claim 19, wherein the cooling chamber is formed along one side of the pumping chamber.

* * * * *